(12) United States Patent
Lauka et al.

(10) Patent No.: US 10,445,116 B1
(45) Date of Patent: Oct. 15, 2019

(54) CONTEXT INTERACTION DETERMINATION SERVICE

(71) Applicant: Amazon Technologies, Inc., Seattle, WA (US)

(72) Inventors: Wesley Scott Lauka, Seattle, WA (US); Andrew Olcott, Seattle, WA (US); Adrienne Jiambalvo Wilhoit, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 45 days.

(21) Appl. No.: 15/634,719

(22) Filed: Jun. 27, 2017

(51) Int. Cl.
  *G06F 9/451* (2018.01)
  *G06F 3/0482* (2013.01)
  *G06Q 30/06* (2012.01)

(52) U.S. Cl.
  CPC ......... *G06F 9/453* (2018.02); *G06Q 30/0643* (2013.01); *G06F 3/0482* (2013.01)

(58) Field of Classification Search
  CPC .................................................. G06Q 30/0643
  USPC .................................................. 715/763–765
  See application file for complete search history.

(56) References Cited

U.S. PATENT DOCUMENTS

2013/0115927 A1* 5/2013 Gruber .................... H04W 4/16
  455/414.1
2015/0242940 A1* 8/2015 Cockcroft .......... G06Q 30/0643
  705/27.2

\* cited by examiner

*Primary Examiner* — Cao H Nguyen
(74) *Attorney, Agent, or Firm* — Knobbe, Martens, Olson & Bear, LLP (57) ABSTRACT

Systems and methods are described for providing a context interaction determination service. A context interaction determination service may determine that a user has selected a context-specific item in a contextual user interface, and may notify the user that a more specific context is available and provide additional information regarding the new context. A contextual user interface may be associated with a context, which in turn may be associated with a provider or providers of items. The context interaction determination service may determine that a selected item is associated with a particular provider and context, and that a set of previously selected items does not include any items associated with that context. The context interaction determination service may thus notify the user of the interaction with the new context, display a user interface or provider-specific criteria for the new context, or provide other information regarding the new context.

20 Claims, 8 Drawing Sheets

CONTEXT INTERACTION DETERMINATION SERVICE

BACKGROUND

Generally described, computing devices and communication networks can be utilized to exchange information. In a common application, a computing device can request information from another computing device or devices via a communication network. For example, a user of a personal computing device can utilize a software application process, typically referred to as an "app" or a "browser," to request information via the Internet regarding goods or services that are offered by third parties and made available through a server computing device or devices. In such embodiments, the personal computing device can be referred to as a client computing device or a mobile computing device.

Mobile computing devices may therefore obtain and provide relevant information regarding goods or services (collectively and individually referred to as "items") that are made available by multiple third parties, either by obtaining information from various third-party sites or by obtaining information from a centralized server (referred to as a "network site") that aggregates third-party information. The third parties, in turn, may have various conditions and requirements with regard to making their items available.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, aspects of the present disclosure are directed to systems, methods, and computer-readable media related to determining contexts for interactions with user interfaces, and thereby providing a technical solution to a problem specifically arising in the realm of computer networks. A context, as used herein, may be associated with a particular provider or providers of items, such as a particular store, restaurant, provider of hosted computing services, or other provider. The items may be, for example, goods, services, and/or information that providers make available for acquisition through the network site. Some items may be available from multiple providers, or various providers may make similar or complementary items available. The operator of the network site may therefore provide contextual user interfaces that enable browsing and selecting items made available by a number of providers.

A contextual user interface, in some aspects, may enable items with the items provided by the provider(s) that are associated with a context, and may further provide context-specific information, such as information or criteria relating to the provider(s). It will thus be understood that various contexts may include or exclude items, criteria, or other information depending on whether the context is associated with a particular provider or providers.

Individual providers may make items available under provider-specific conditions. For example, a provider may specify a minimum order requirement or a delivery window for the items available from that provider. When selecting items through interfaces that enable interaction with items from multiple providers, users may thus select items from a variety of providers without meeting the conditions of any particular provider, and may therefore be unable to complete an order or may abandon an order due to not meeting the conditions. For example, a user may seek to acquire items from two providers that both have a minimum order threshold. The total amount of items sought may exceed the threshold of either provider, but because the user seeks to acquire some items from one provider and some from the other, the per-provider thresholds are not met and the order cannot be placed. However, the user may not be aware of this issue at the time of item selection, since the provider(s) associated with various items may vary.

To overcome these difficulties, an operator of a network site may implement a context interaction determination service. A context interaction determination service, in some embodiments, may determine that a user has selected an item from a context or provider that is not associated with any previously selected item, and may display a notification or other information that highlights the interaction with the new provider. The context interaction determination service may thus facilitate selection of items that satisfy provider-specific criteria, such as a minimum order requirement or a particular delivery window, by alerting the user with regard to newly selected providers and criteria.

It will be understood that the context interaction determination service described herein improves the performance of a computer at the task of identifying providers of interest with regard to a collection of items that may number in the thousands or millions. By implementing the context interaction determination service, the computer may identify and present relevant information more quickly and efficiently, thereby reducing the amount of computing resources (e.g., memory, processing power, bandwidth, etc.) required to perform this task. It will further be understood that the context interaction determination service described herein addresses a technical problem that specifically arises in the realm of computer networks, where a user may instantaneously and seamlessly transition from one virtual storefront to another without necessarily realizing he or she has done so. For example, in the pre-Internet world, a user would not have difficulty determining the store in which he or she was currently located, and would not enter or exit stores while carrying a set of items that had been selected, but not yet purchased, from previously visited stores. The possibility also would not arise of the pre-Internet user being in multiple stores at once, or of the pre-Internet user teleporting from store to store while browsing and selecting items. The pre-Internet user thus would not require a notification when entering a previously unvisited store. By providing such notifications and delivering context-specific information as needed, the context interaction determination service resolves these technology-specific problems.

As used herein, the term "item," in addition to having its ordinary meaning, is used interchangeably to refer to an item itself (e.g., a particular product) and to its description or representation in a computer system or electronic catalog. As will be apparent from the context in which it is used, the term is also sometimes used herein to refer only to the item itself or only to its representation in the computer system.

The foregoing aspects and many of the attendant advantages will become more readily appreciated as the same become better understood by reference to the following detailed description, when taken in conjunction with the accompanying drawings.

Figure 1A:
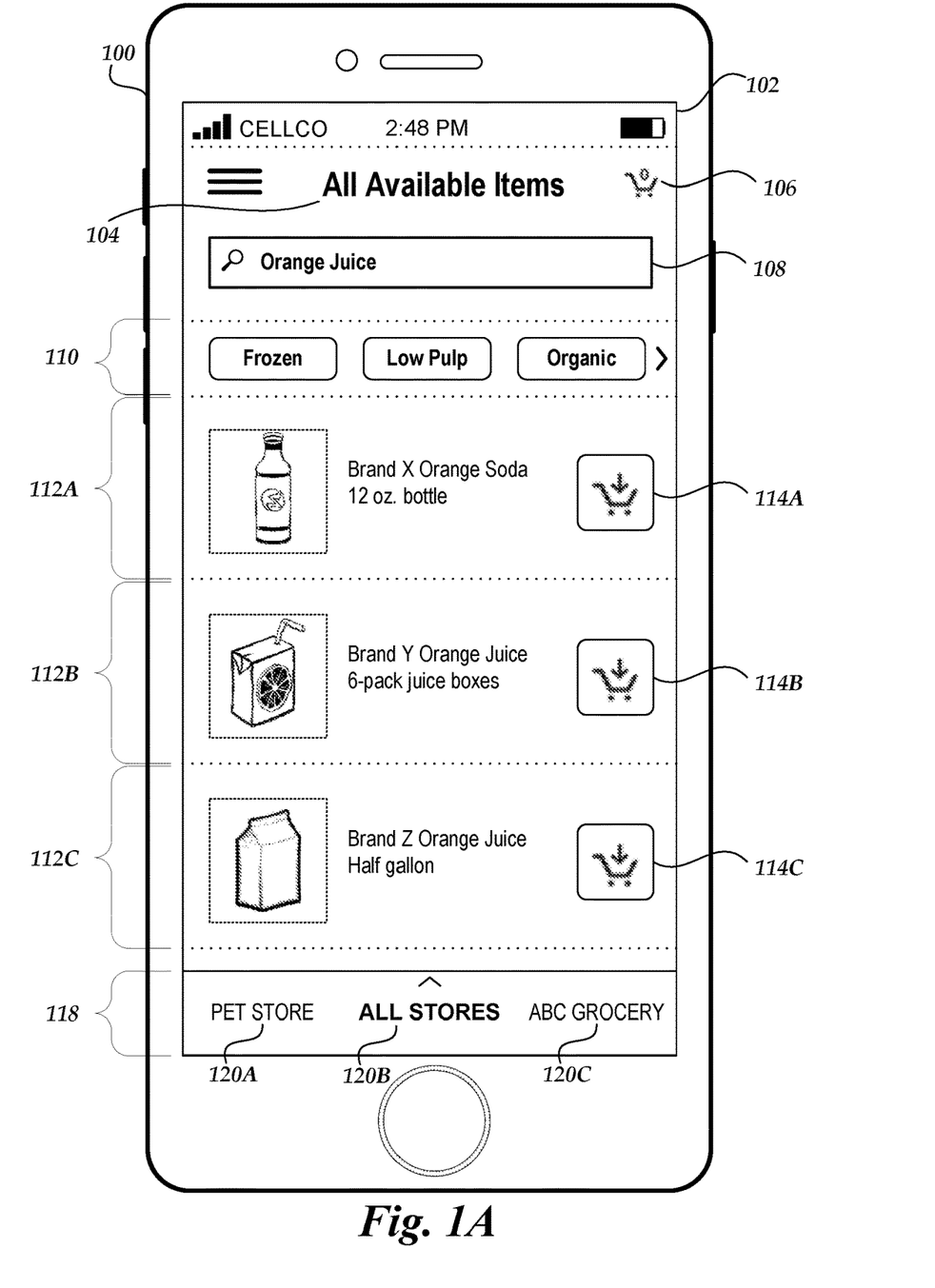
FIGS. 1A-1E are pictorial diagrams depicting illustrative user interfaces for selecting items and notifying users of item contexts in accordance with aspects of the present disclosure.

FIG. 1A is a pictorial diagram of an illustrative mobile computing device 100, which displays an illustrative contextual user interface 102 in accordance with aspects of the present disclosure. The mobile computing device 100 is described in more detail with reference to FIG. 4 below. The illustrative contextual user interface 102 may include a description 104, which indicates the scope or context of what the contextual user interface 102 displays. In the illustrated embodiment, the description 104 indicates that the currently displayed context is associated with all available providers (the "all stores" context 120B), and thus the items 112A-C displayed in the contextual user interface 102 may be associated with any available provider or providers.

The contextual user interface 102 may further include a selected items indicator 106, which indicates the number of items that the user has selected by interacting with the contextual user interface 102. In some embodiments, the selected items indicator 106 may indicate the number of items selected in the currently displayed context. In other embodiments, the selected items indicator 106 may indicate the number of items selected in all contexts, regardless of whether an all-inclusive context is currently displayed. The contextual user interface may further include a search control 108 (e.g., a search bar), which enables entry of search criteria. In the illustrated embodiment, a user has entered the text "Orange Juice" into the search control 108, and has obtained the displayed items 112A-C as search results.

The contextual user interface 102 may further include an item category selector 110, which enables filtering of search results according to item categories or characteristics. As illustrated in FIG. 1A, the item category selector 110 enables refining the search results to include only a particular type or types of orange juice products (e.g., frozen, low pulp, organic, and so forth).

The contextual user interface 102 may further include items 112A-C. Illustratively, each of the items 112A-C may be associated with one or more providers. For example, the "Brand Y Orange Juice" item 112B may be associated with the provider "ABC Grocery." As a further example, the "Brand Z Orange Juice" item 112C may be associated with the provider "DEF Grocery," or with multiple providers (e.g., both "ABC Grocery" and "DEF Grocery"). The contextual user interface 102 may further include item selection controls 114A-C. Each of the item selection controls 114A-C may correspond to, and enable selection of, a respective item of the items 112A-C.

The contextual user interface 102 may further include a context selector 118, which enables selection of context 120A, 120B, or 120C. It will be understood that "context" may be used herein to refer to both a context and a user interface control (or portion of a user interface control) that enables selection of the context. In the illustrated embodiment, the "all stores" context 120B is selected and corresponds to the displayed contextual user interface 102. As described and illustrated below, the context selector 118 may enable selection of further contexts through user interaction. For example, a touch gesture (e.g., a swipe to the left or right) may cause the context selector 118 to display additional contexts, which may then be selected by another touch gesture (e.g., a tap or long press). Further examples of context selectors and contextual user interfaces may be described in U.S. patent application Ser. No. 15/619,014, titled "CONTEXTUAL INTERFACE FOR ITEM SELECTION" and filed Jun. 9, 2017, the entirety of which is incorporated herein by reference.

It will be understood that the contextual user interface 102 is provided for purposes of example, and that various interfaces containing more, fewer, or different elements are within the scope of the present disclosure. For example, any or all of the user interface elements 104-118 may be omitted, combined, separated, reordered, or repositioned relative to each other. The contextual user interface 102 is thus understood to be illustrative and not limiting.

Figure 1B:
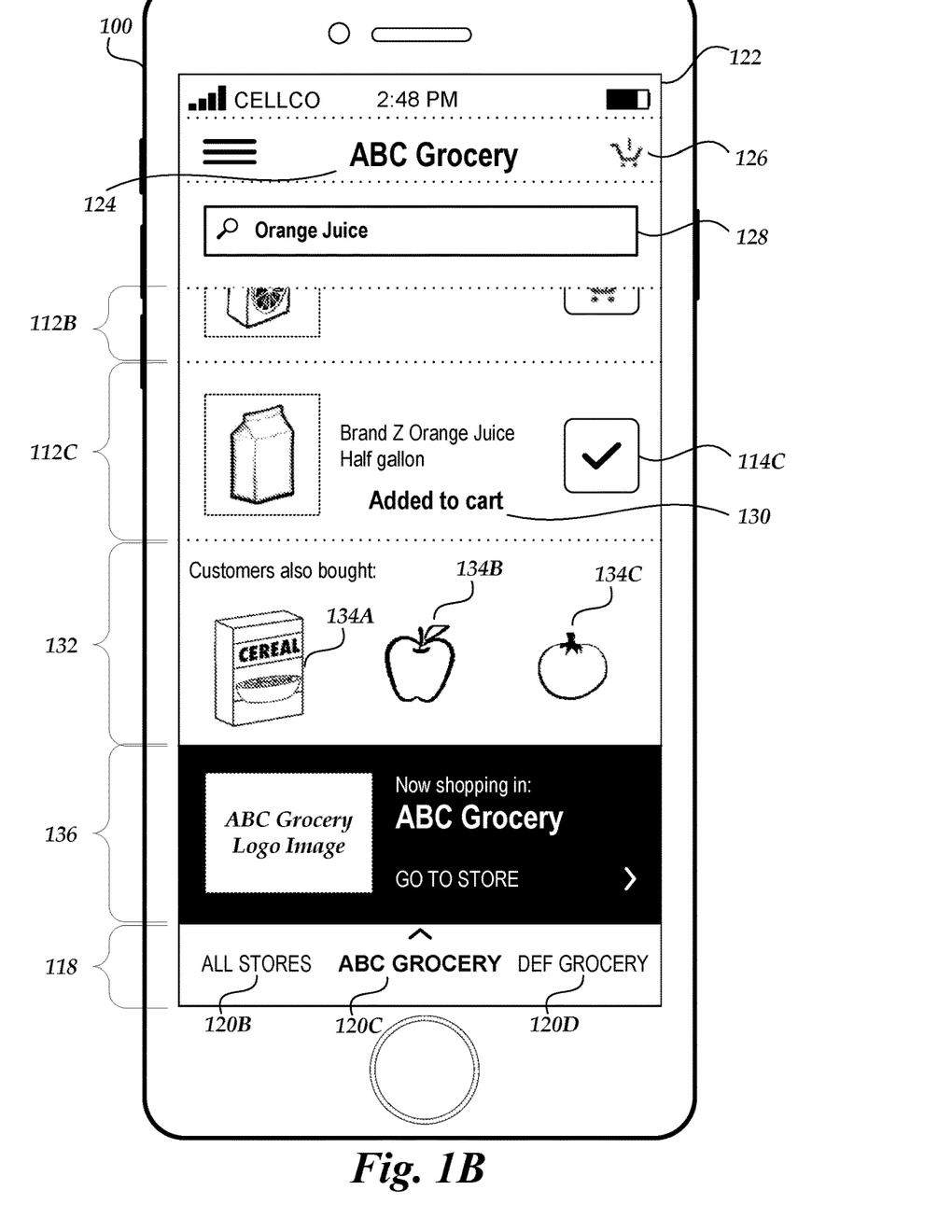

FIG. 1B is a pictorial diagram of the mobile computing device 100 displaying a second illustrative contextual user interface 122 in accordance with aspects of the present disclosure. The contextual user interface 122 is associated with the "ABC Grocery" context 120C, as indicated by the context selector 118 and other user interface elements. For example, the contextual user interface 122 may include a description 124 that is specific to the context 120C, a selected items indicator 126 (which, as described above, may be specific to the "ABC Grocery" context), a search control 128 that enables querying for search results within the context 120C, and other such user interface elements. In the illustrated embodiment, the context 120C corresponds to a particular provider of items (a grocery store named "ABC Grocery"). In other embodiments, the context 120C may correspond to a provider, a group of providers, a category of providers, a location or region, all available providers, or various other contexts. For example, the context 120C may be associated with restaurants, pharmacies, grocery stores, stores at a particular shopping mall, providers of a particular type or category of product (e.g., pet supplies), and so forth.

In the illustrated embodiment, the user has selected an item 112C via an interaction with the corresponding item selection control 114C. The contextual user interface 122 may further include a confirmation message 130, which confirms that the item 112C was selected. In some embodiments, as described in more detail below, a context interaction determination service may determine that a user selection of the "Brand Z Orange Juice" item 112C is the user's first selection of an item associated with the "ABC Grocery" context, and may therefore cause display of a contextual user interface (e.g., it may cause a transition from contextual user interface 102 to contextual user interface 122), a notification (e.g., notification 136, as described below), or other context-specific user interface elements.

The contextual user interface 122 may further include a recommended items display 132, which displays recommended items 134A-C. In some embodiments, the recommended items 134A-C may be associated with the "ABC Grocery" context, and may be displayed in response to the selection of the item 112C. In other embodiments, the recommended items 134A-C may be associated with any context.

The contextual user interface 122 further includes a notification 136, which indicates that the user has selected an item associated with the "ABC Grocery" context. As described in more detail below, a context interaction determination service may cause display of the notification 136 if a user has never selected an item provided by "ABC Grocery," if the user has not selected an item from "ABC Grocery" within a specified time period, if the user has started a new session, if a contextual user interface corresponding to "ABC Grocery" has not been displayed within a specified time period, or based on other criteria such as user preferences or user histories. For example, a context interaction determination service may determine that a list of previously selected items, such as the items indicated by the selected items indicator 106 of FIG. 1A, does not include any items from "ABC Grocery." The context interaction determination service may therefore cause display of the notification 136.

Figure 1C:
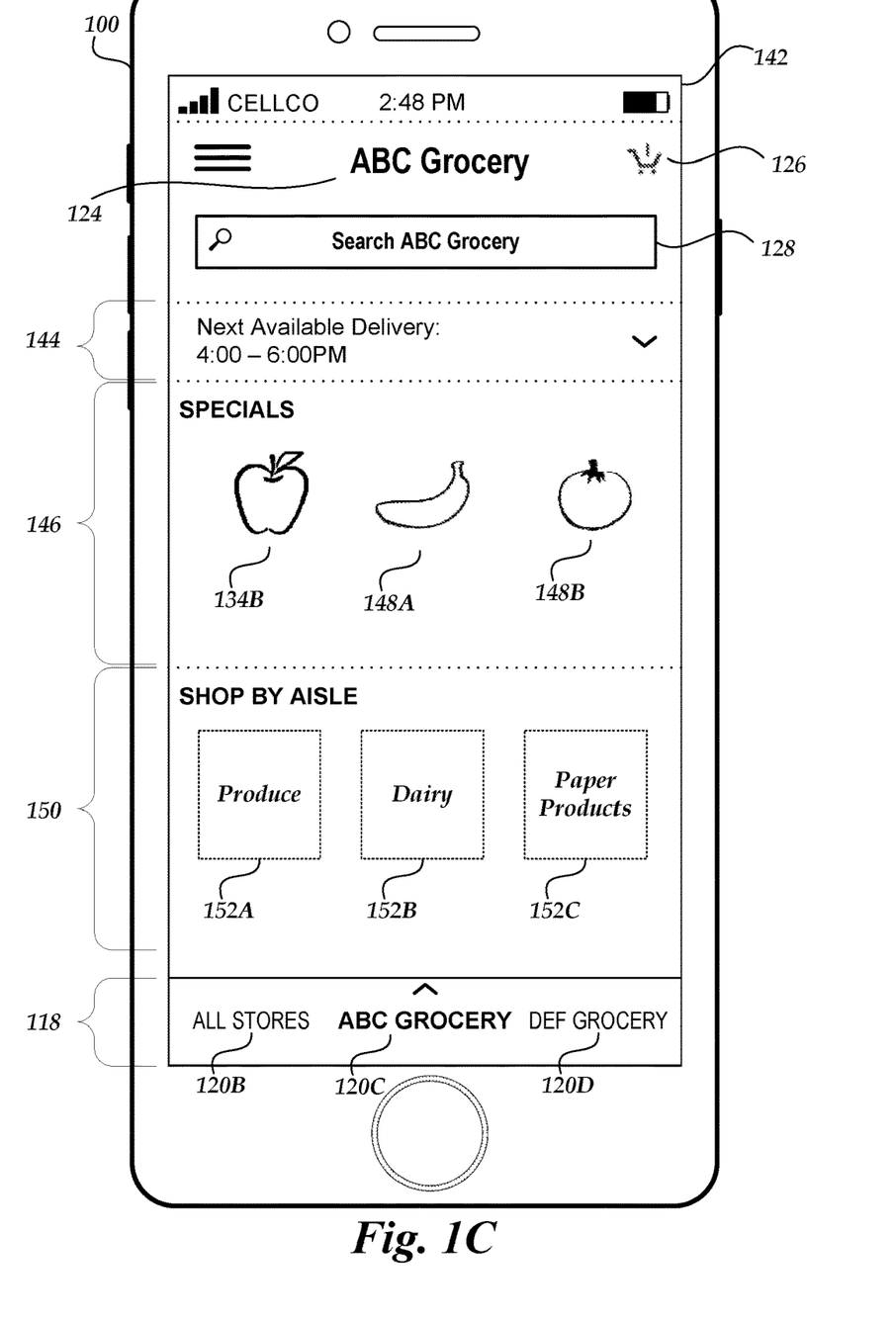

In some embodiments, user selection of the notification 136, or user selection of a user interface element displayed within the notification 136, may further enable display of a default contextual user interface (e.g., "home page" or "front page") that is associated with "ABC Grocery," such as the contextual user interface 142 of FIG. 1C. In other embodiments, as described in more detail below, the notification 136 may display additional information regarding "ABC Grocery" or the selected item 112C.

In various embodiments, the notification 136 may be displayed as a component of the contextual user interface 122, as an element floating above the contextual user interface 122, by scrolling or distorting all or part of the contextual user interface 122 (e.g., by visually "pushing" or "squeezing" the contextual user interface 122 to make room for the notification 136), as a component of the context selector 118, or in other configurations. The contextual user interface 122 may further include the context selector 118, which in the illustrated embodiment now indicates that the "ABC Grocery" context 120C is displayed, and further displays selectable contexts 120B and 120D.

It will be understood that the contextual user interface 122 is provided for purposes of example, and that the user interface elements described with reference to FIG. 1B may be varied without departing from the scope of the present disclosure.

FIG. 1C is a pictorial diagram of the mobile computing device 100 displaying a third illustrative contextual user interface 142 in accordance with aspects of the present disclosure. As described above, the contextual user interface 142 is a default contextual interface associated with the "ABC Grocery" context 120C. Illustratively, the contextual user interface 142 may be displayed in response to a user interaction with the notification 136 of FIG. 1B, as described above.

As illustrated, the contextual user interface 142 may include the context-specific description 124, selected items indicator 126, and search control 128 as described above, and may further include context-specific information such as delivery information 144 and an item display 146, which may display items 134B, 148A, and 148B. Items 134B, 148A, and 148B may be associated with the "ABC Grocery" context 120C. In some embodiments, one or more of the items 134B, 148A, and 148B may further be associated with other contexts. The contextual user interface 142 may further include an item category selector 150, which may enable user selection of item categories 152A-C. The contextual user interface 142 further includes the context selector 118, as described above with reference to FIG. 1B.

It will be understood that the contextual user interface 142 is provided for purposes of example, and that the user interface elements described with reference to FIG. 1C may be varied without departing from the scope of the present disclosure.

Figure 1D:
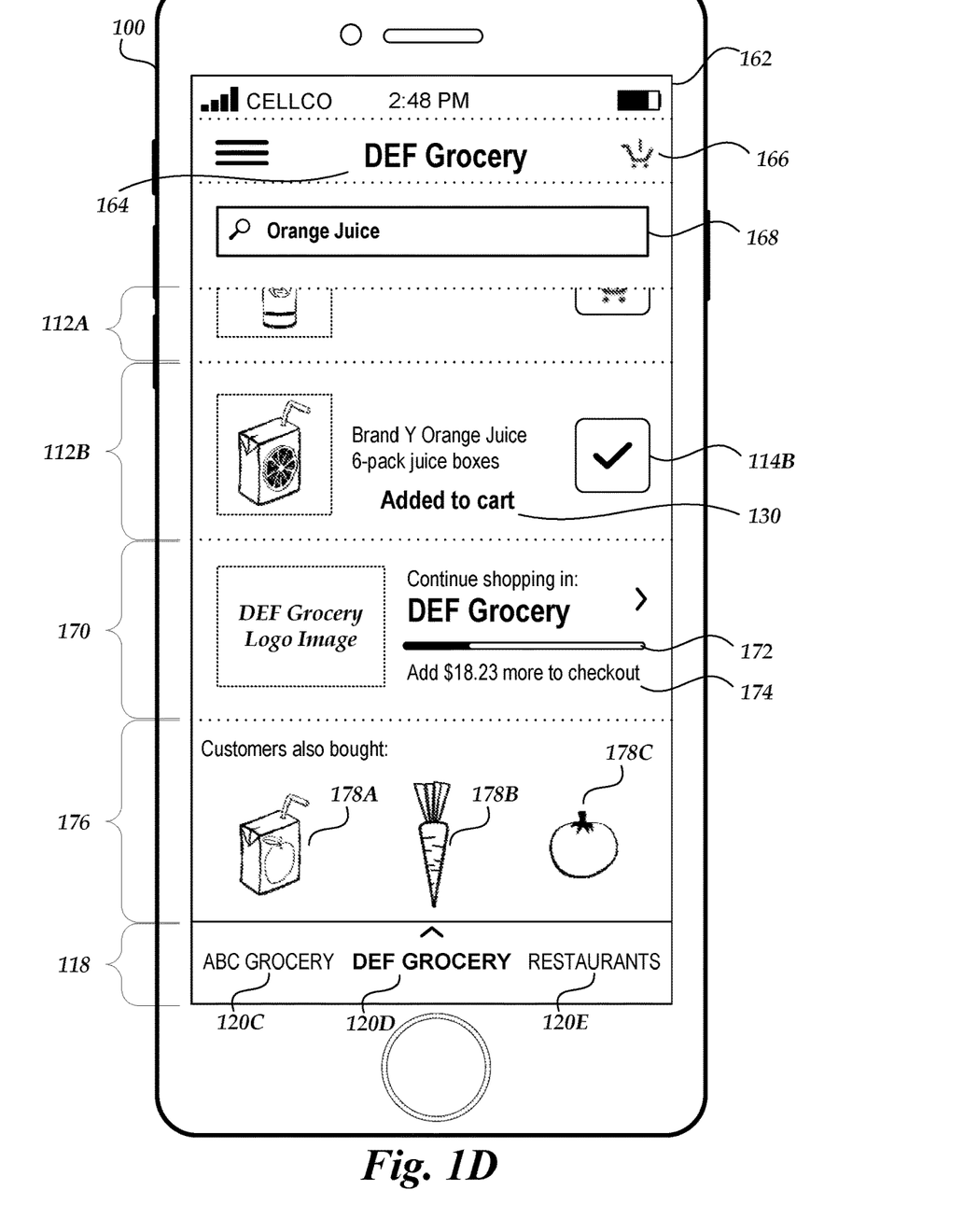

FIG. 1D is a pictorial diagram of the mobile computing device 100 displaying a fourth contextual user interface 162 in accordance with aspects of the present disclosure. The contextual user interface 162 may, in various embodiments, be displayed in addition to, or as an alternative to, the contextual user interface 122 depicted in FIG. 1B. In the illustrated embodiment, the contextual user interface 162 may include user interface elements that are specific to the "DEF Grocery" context 120D, such as a context-specific description 164, selected items indicator 166, and search control 168.

The contextual user interface 162 may further include items 112A and 112B, as previously described with reference to FIG. 1A. In FIG. 1D, the user has selected the "Brand Y Orange Juice" item 112B using the item selection control 114B, and the item 112B is associated with the "DEF Grocery" context 120D. In some embodiments, as described below, a context interaction determination service may determine that the selected item 112B is associated with the "DEF Grocery" context 120D, and may thus cause the contextual user interface 162 to display. For example, the user may select the item 112B via interaction with the contextual user interface 102, and in response the context interaction determination service may cause display of the contextual user interface 162. The contextual user interface 162 may further include a confirmation message 130, as previously described.

The contextual user interface 162 may further include a notification 170, which is displayed in-line with the contextual user interface 162. The notification 170 may include a progress bar 172 and a progress description 174, which may display information with regard to the selected item 112B and a context-specific criterion, such as a minimum order requirement associated with the "DEF Grocery" context 120D. Illustratively, the notification 170 may indicate that selecting the item 112B has partially satisfied a criterion associated with the "DEF Grocery" context, and may indicate (via the progress bar 172 or the progress description 174) an additional quantity that must be selected or other action that must be performed in order to satisfy the criterion.

The contextual user interface 162 may further include a recommended items display 176, which may display recommended items 178A-C, and a context selector 118 as described above. In the illustrated embodiment, the context selector 118 now indicates that the "DEF Grocery" context 120D is selected, and displays selectable contexts 120C and 120E, which may be selected by interacting with the context selector 118.

It will be understood that the contextual user interface 162 is provided for purposes of example, and that the user interface elements described with reference to FIG. 1D may be varied without departing from the scope of the present disclosure.

Figure 1E:
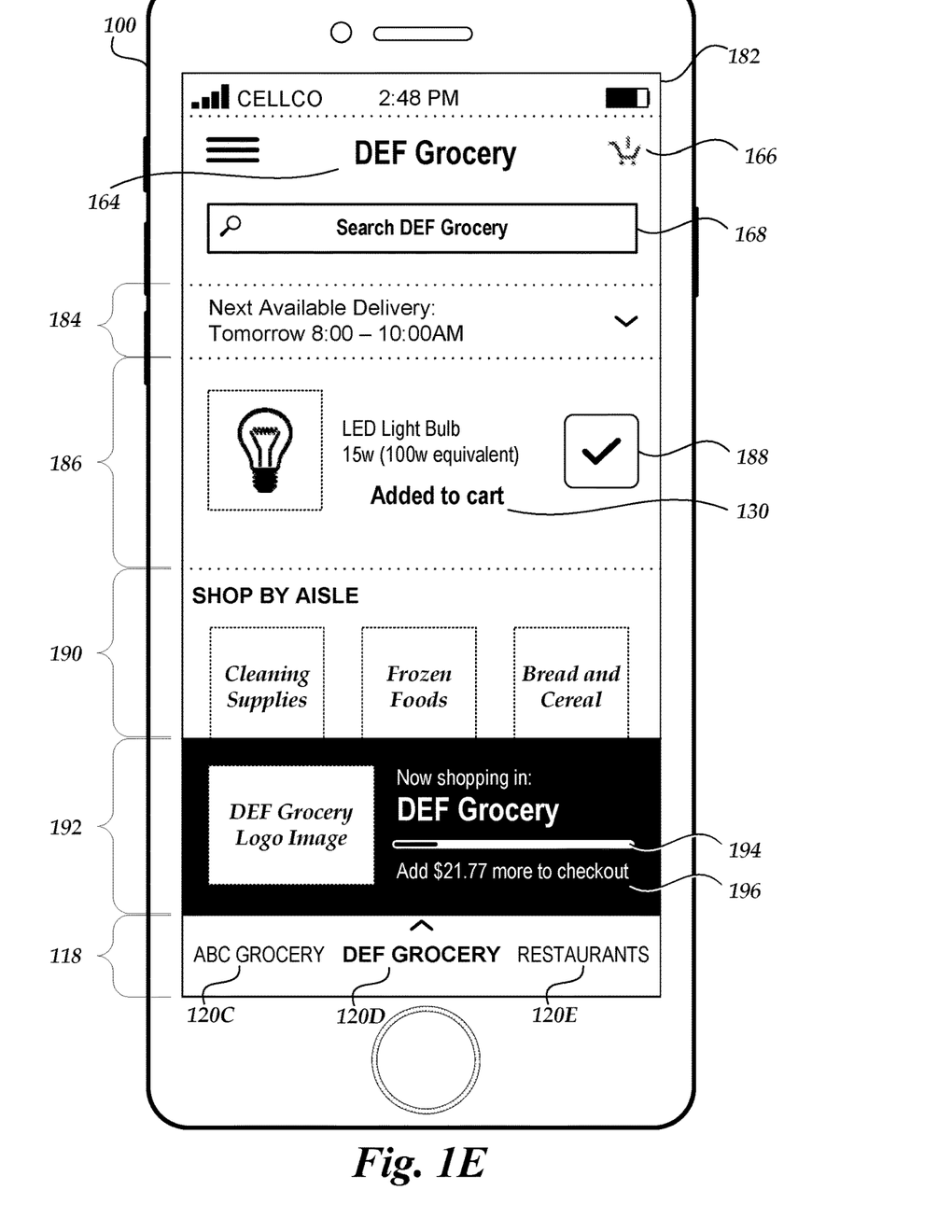

FIG. 1E is a pictorial diagram of the mobile computing device 100 displaying a fifth contextual user interface 182 in accordance with aspects of the present disclosure. The contextual user interface 182 may, in various embodiments, be displayed in addition to, or as an alternative to, the contextual user interfaces 122 and 162 depicted in FIGS. 1B and 1D. Illustratively, the contextual user interface 182 may be displayed in response to a user navigating to the "DEF Grocery" context 120D and selecting an item displayed in that context, as compared to contextual user interfaces 122 and 162 being displayed in response to a user selecting an item 114A-C that was displayed as a search result in the "all stores" context 120B. In various embodiments, contextual user interfaces 122, 162, and 182 may be displayed in response to user selection of an item displayed in the "all stores" context 120B, displayed in a context associated with multiple providers, or displayed in a provider-specific context, such as the "ABC Grocery" context 120C or the "DEF Grocery" context 120D. In the illustrated embodiment, the contextual user interface 182 may include a context-specific description 164, selected items indicator 166, and search control 168, as described above. The contextual user interface 182 may further include delivery information 184 for the "DEF Grocery" context 120D.

The contextual user interface 182 may further include a selected item 186, which the user has selected via an interaction with the item selection control 188. The contextual user interface 182 therefore displays the confirmation message 130 in conjunction with the item 186 to confirm that the item 186 was selected. The contextual user interface 182 may further include an item category selector 190, which may enable user selection of item categories as described above.

The contextual user interface 182 further includes a notification 192, which notifies the user of a first selection made in the "DEF Grocery" context 120D. In some embodiments, the notification 192 may include a progress bar 194 or a progress description 196, which function similarly to the progress bar 172 and progress description 174 described above with reference to FIG. 1D. In further embodiments, user interaction with the notification 192 may cause the notification 192 to be dismissed rather than causing display of a contextual user interface associated with the "DEF Grocery" context, since the contextual user interface 182 is associated with that context and already displayed.

The contextual user interface 182 may further include a context selector 118, as described above, which enables selection of contexts including contexts 120C-E. In some embodiments, the context selector 118 may further display context-specific information, such as a number of items selected in each of the contexts 120C-E, delivery information for each of the contexts 120C-E, or other information.

It will be understood that the contextual user interfaces depicted in FIGS. 1A-1E are provided for purposes of example, and that various other contextual user interfaces that include more, fewer, or different elements are within the scope of the present disclosure. For example, the notification 136 may display a progress bar 172, or the notification 170 may be displayed below the context selector 118. The contextual user interfaces depicted in FIGS. 1A-1E are thus understood to be illustrative and not limiting. In various embodiments, as described above and below, a context interaction determination service may determine that a contextual user interface 102, 122, 142, 162, or 182 should be displayed, and subsequently display the determined contextual user interface.

Figure 2:
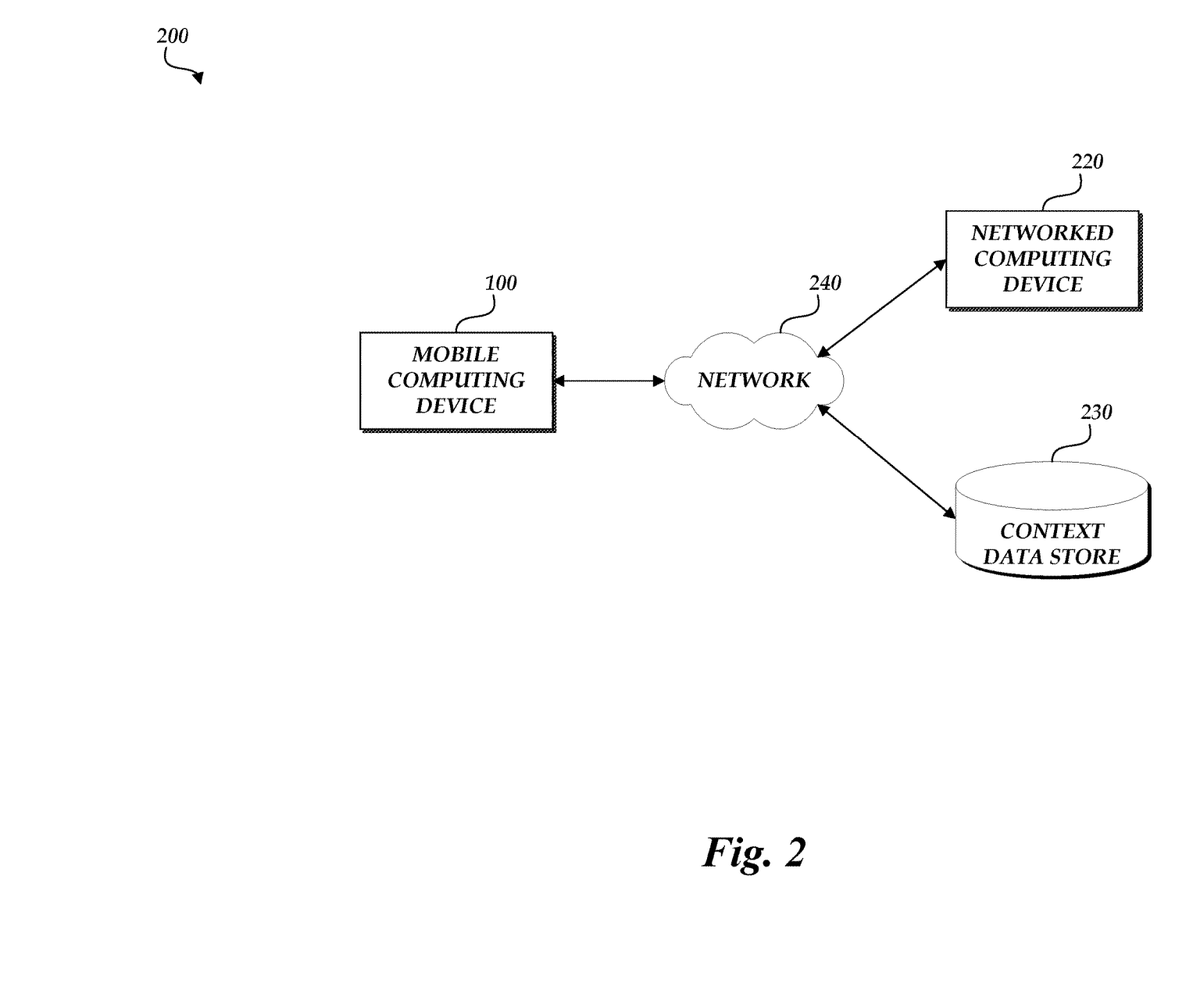
FIG. 2 is a functional block diagram depicting an illustrative network environment for implementing a context interaction determination service in accordance with aspects of the present disclosure.

FIG. 2 is a functional block diagram depicting an illustrative network environment 200 for implementing a context interaction determination service in accordance with aspects of the present disclosure. The illustrated network environment 200 depicts the mobile computing device 100, a networked computing device 220, and a context data store 230 communicating via a network 240.

The mobile computing device 100 is described in more detail with reference to FIG. 4 below. In some embodiments, the mobile computing device 100 may implement a context interaction determination service as described herein. In other embodiments, the mobile computing device 100 may communicate via the network 240 with a networked computing device 220 that implements a context interaction determination service.

The networked computing device 220 may illustratively be any computing device that implements aspects of the present disclosure, including but not limited to aspects such as providing a context interaction determination service. In some embodiments, the networked computing device 220 may implement a database server, web server, application programming interface (API), or other interface that is utilized by the mobile computing device 100 to access context data or contextual user interfaces.

The context data store 230 may illustratively be any non-transient computer-readable medium, including but not limited to hard drives, solid state devices, flash memories, EEPROMs, or other storage media. In various embodiments, the context data store 230 may be implemented as a database, a database server, a component of another server or service (e.g., the networked computing device 220), or may be combined with the mobile computing device 100 and made internal to the mobile computing device 100.

The network 240 may be any wired or wireless network, including but not limited to a local area network (LAN), wide area network (WAN), mesh network, cellular telecommunications network, the Internet, or any other public or private communications network or networks. In some embodiments, the network 240 may be omitted, and one or more of the mobile computing device 100, networked computing device 220, or context data store 230 may communicate directly with each other.

It will be understood that many of the components described in FIG. 2 are optional, and that embodiments of the present disclosure may combine or reorganize the components. Furthermore, the components need not be distinct or discrete. For example, the context data store 230 may be implemented as a component of the networked computing device 220, or the mobile computing device 100, networked computing device 220, and context data store 230 may be represented in a single physical device, or, alternately, may be split into multiple physical devices.

Figure 3:
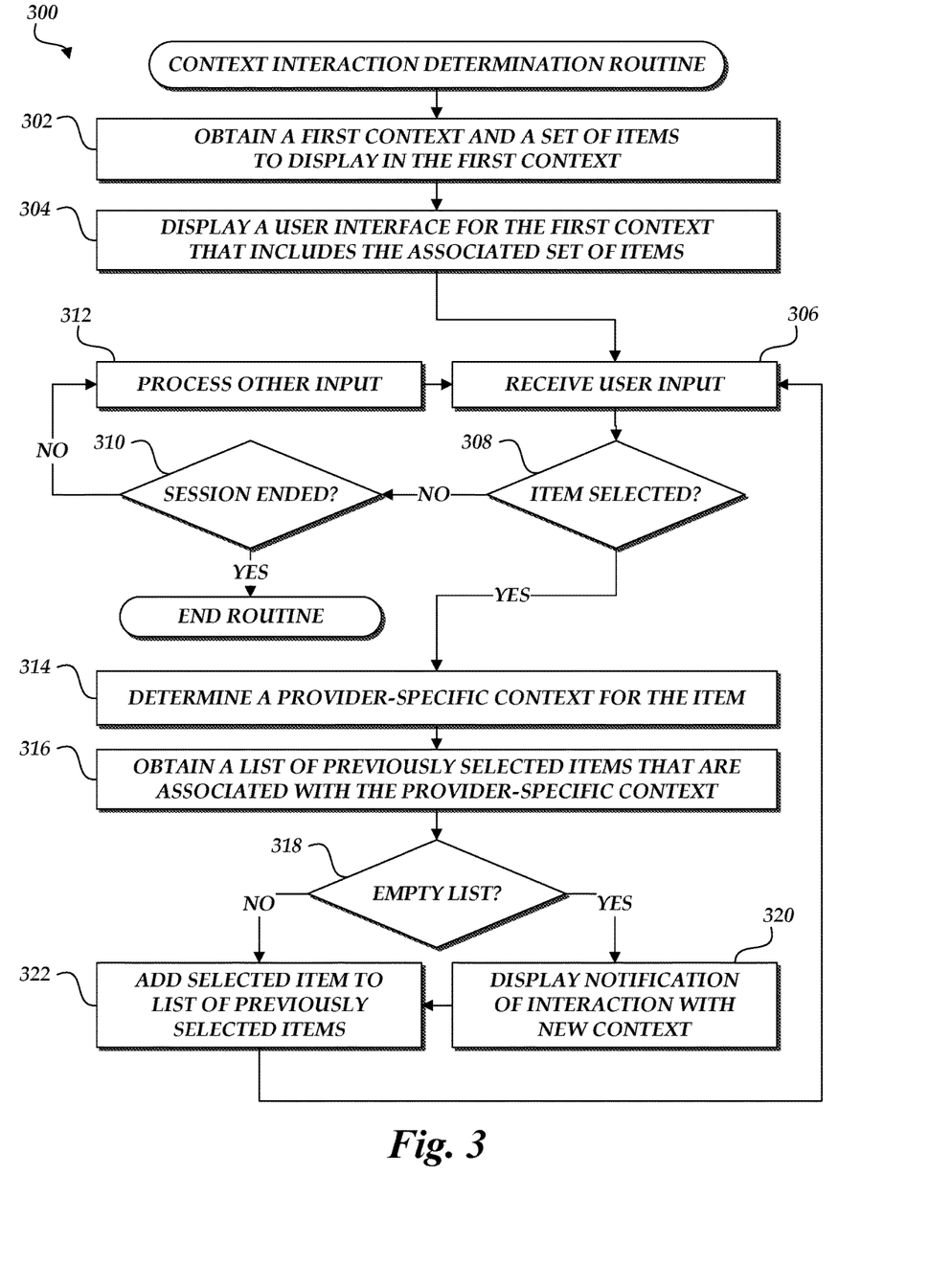
FIG. 3 is a flow diagram depicting an illustrative context interaction determination routine that may be implemented by a context interaction determination service in accordance with aspects of the present disclosure.

FIG. 3 is a flow diagram depicting an illustrative context interaction determination routine 300. The illustrative routine 300 may be carried out in whole or in part, for example, by the mobile computing device 100 of FIG. 2, the networked computing device 220 of FIG. 2, or both. At block 302, a context and a set of items to display in the context may be obtained. Illustratively, the first context may be associated with a number of item providers (or with all providers), and the items to display in the first context may thus be associated with various providers and with other, provider-specific contexts. In some embodiments, a plurality of contexts may be obtained, and the first context may be determined from the plurality based on criteria such as user preferences, previously displayed contexts, and the like.

At block 304, a contextual user interface associated with the first context may be displayed, and may display some or all of the associated set of items. In some embodiments, the contextual user interface may be generated prior to display. In other embodiments, the contextual user interface may be obtained from a contextual user interface generation routine, a data store, or another source. Illustratively, the contextual user interface displayed at block 304 may be, for example, the contextual user interface 102 described in FIG. 1A above.

At block 306, user input may be received via the displayed contextual user interface. At decision block 308, a determination may be made as to whether the user input represents selection of an item via the contextual user interface. If not, then at decision block 310 a determination may be made as to whether the user input represents the end of a session. For example, the user input may represent closing the contextual user interface, exiting an application on the mobile computing device 100, or the like. If the determination at decision block 310 is that the user input represents the end of a session, then the routine 300 ends. If not, then at block 312 the user input may be processed. For example, the user input may represent a search query, navigation to an item detail page, or the like. The routine 300 then returns to block 306 and awaits further input.

If the determination at decision block 308 is instead that the user input represents selection of an item, then at block 314 a provider-specific context may be determined for the selected item. For example, an item 112C may be selected, and the determination may be that the item 112C is associated with the "ABC Grocery" context 120C. It will be understood that an item 112C may be associated with multiple contexts, including the "all stores" context 120B, and that the provider-specific context for an item may thus be a context that corresponds to a single provider of items (e.g., "ABC Grocery"). It will further be understood that an item 112C may be associated with more than one provider-specific context. In some embodiments, a determination may be made that multiple provider-specific contexts are available for the selected item, and a user interface or user interface element may be displayed that enables selection of one of the provider-specific contexts. In other embodiments, a provider-specific context may be determined from among several such contexts based on user preferences, previous user selections, previously displayed contextual user interfaces, or other criteria.

At block 316, a list of items that were previously selected and that are associated with the provider-specific context may be obtained. In some embodiments, a list of previously selected items may be obtained, and a subset of items that are associated with the provider-specific context may be determined. In further embodiments, a list of providers may be determined from the list of previously selected items. As described above, the list of previously selected items may be time-bound or session-bound, such that the list comprises all items that were previously selected within a certain time period, within a particular session or sessions, and so forth. It will be understood that a "session," in various embodiments, may refer to a certain time period, set of communications, set of actions, and the like, or may be defined in terms of a session-opening interaction (e.g., opening an application, putting the application in the foreground, etc.) and a session-closing interaction (e.g., closing the application, putting the application in the background, emptying the list of previously selected items, etc.). [0052] At decision block 318, a determination may be made as to whether the list obtained at block 316 is an empty list, indicating that the selected item from decision block 308 is the first item to be selected from the provider-specific context. In some embodiments, the list obtained at block 316 may include the selected item (e.g., it may be a list of selected items, rather than a list of previously selected items), and the determination may be as to whether the selected item is the only item in the list associated with the provider-specific context. In other embodiments, a list of providers of previously selected items may be obtained or determined at block 316, and the determination at decision block 318 may be as to whether the provider that corresponds the provider-specific context is on the list of providers of previously selected items.

If the determination at decision block 318 is that the selected item represents an interaction with a new context, then at block 320 a notification may be displayed. The notification may be, for example, the notification 136, 170, or 192 of FIGS. 1B, 1D, and 1E respectively. In some embodiments, the notification may inform the user that a provider-specific context is available, and may further enable selection and display of the provider-specific context. In further embodiments, as described above, the notification may provide information regarding the selected item, the provider-specific context, and provider-specific information or criteria.

Thereafter, or if the determination at decision block 318 is that the selected item does not represent interaction with a new provider of items, the routine 300 continues at block 322, where the selected item may be added to the list of previously selected items. The routine 300 then branches to block 306, where further user input may be obtained, and iterates until the user ends the session.

In some embodiments, associating a selected item with a particular provider and provider-specific context may be deferred until a later item is selected. For example, a selected item may be provided by both "ABC Grocery" and "DEF Grocery." The routine 300 may thus add the item to the list of previously selected items without associating it with a particular provider-specific context. A later iteration of the routine 300 may then receive user input selecting an item that is associated only with the "DEF Grocery" context. The routine 300 may thus associate both the previously selected item and the currently selected item with the "DEF Grocery" context, and thereby reduce the number of providers associated with selected items. In other embodiments, as described above, the routine 300 may determine a provider for an item that is associated with multiple providers based on previously selected items, previously displayed contextual user interfaces, user preferences, or other criteria.

In various embodiments, the blocks of the routine 300 may be combined, omitted, or carried out in various orders. For example, decision blocks 308 and 310 may be carried out in either order, or in parallel. As a further example, block 316 may be carried out prior to block 314 or prior to execution of the routine 300, and the determination at decision block 318 may be as to whether any of the items in the list of previously selected items are associated with the provider or the provider-specific context. The routine 300 is thus understood to be illustrative and not limiting.

Figure 4:
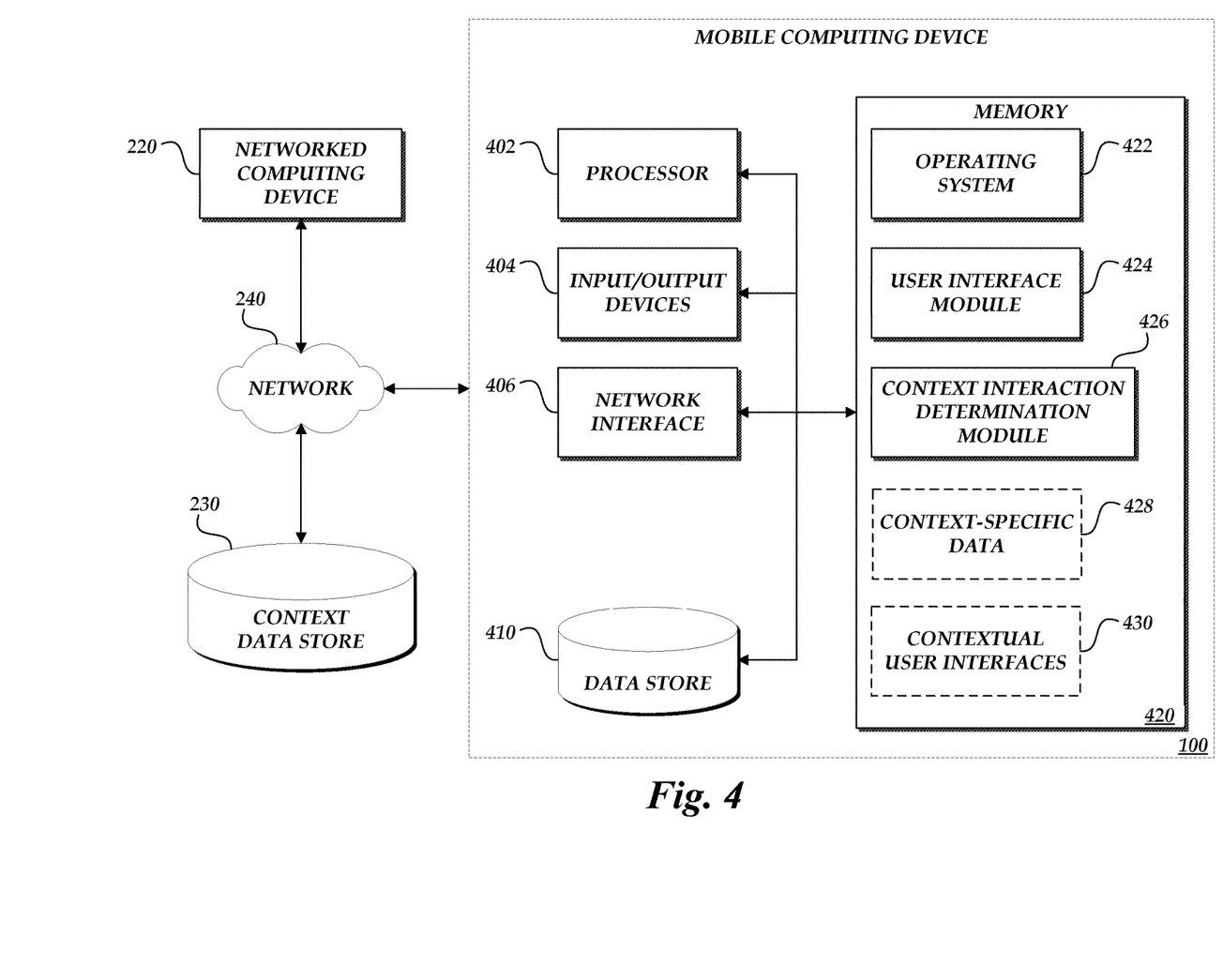
FIG. 4 is a block diagram depicting a general architecture of an example mobile computing device for implementing aspects of the present disclosure.

FIG. 4 depicts a network topology including the networked computing device 220, the context data store 230, the network 240, and a general architecture of the mobile computing device 100, which includes an arrangement of computer hardware and software components that may be used to implement aspects of the present disclosure. The network topology and the mobile computing device 100 may include many more (or fewer) elements than those shown in FIG. 4. It is not necessary, however, that all of these elements be shown in order to provide an enabling disclosure.

As illustrated, the mobile computing device 100 includes a processor 402, input/output devices 404, a network interface 406, and a data store 410, all of which may communicate with one another by way of a communication bus. The network interface 406 may provide connectivity to one or more networks (such as network 240) or computing systems and, as a result, may enable the mobile computing device 100 to receive and send information and instructions from and to other computing systems or services, such as the networked computing device 220. In some embodiments, the networked computing device 220 may be configured to process requests from the mobile computing device 100, such as requests to provide notifications regarding interactions with new contexts as described above.

The processor 402 may also communicate to and from a memory 420. The memory 420 may contain computer program instructions (grouped as modules or components in some embodiments) that the processor 402 may execute in order to implement one or more embodiments. The memory 420 generally includes RAM, ROM, and/or other persistent, auxiliary, or non-transitory computer-readable media. The memory 420 may store an operating system 422 that provides computer program instructions for use by the processor 402 in the general administration and operation of the mobile computing device 100. The memory 420 may further store specific computer-executable instructions and other information (which may be referred to herein as "modules") for implementing aspects of the present disclosure. For example, the memory 420 may include a user interface module 424, which may perform various operations with regard to displaying the user interfaces described herein. For example, the user interface module 424 may manage the display of contextual user interfaces and manage the processing of user input via these interfaces.

In some embodiments, the memory 420 may include a context interaction determination module 426, which may be executed by the processor 402 to perform various operations, such as those operations described with reference to FIG. 3. The memory 420 may further include context-specific data 428 and contextual user interfaces 430, which may be loaded into the memory 420 as various operations are performed. In some embodiments, the context-specific data 428 and contextual user interfaces 430 may be obtained from the networked computing device 220 via the network 240. In other embodiments, the context-specific data 428 may be obtained from the data store 410, or the contextual user interfaces 430 may be generated by the user interface module 424.

While the operating system 422, the user interface module 424, and the context interaction determination module 426 are illustrated as distinct modules in the memory 420, in some embodiments, the user interface module 424 and the context interaction determination module 426 may be incorporated as modules in the operating system 422 or another application or module, and as such, separate modules may not be required to implement some embodiments. In some embodiments, the user interface module 424 and the context interaction determination module 426 may be implemented as parts of a single application.

It will be recognized that many of the components described in FIG. 4 are optional and that embodiments of the mobile computing device 100 may or may not combine components. Furthermore, components need not be distinct or discrete. Components may also be reorganized. For example, the mobile computing device 100 may be represented in a single physical device or, alternatively, may be split into multiple physical devices. In some embodiments, components illustrated as part of the mobile computing device 100 (such as the input/output devices 404) may additionally or alternatively be included in other computing devices, such that some aspects of the present disclosure may be performed by the mobile computing device 100 while other aspects are performed by another computing device.

It will be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

What is claimed is:

1. A system comprising:
    a data store configured to store computer-executable instructions; and
    a processor in communication with the data store, wherein the computer-executable instructions, when executed by the processor, configure the processor to at least:
        cause display of a first contextual user interface associated with a first context, wherein the first context includes at least a first provider and a second provider, and wherein the first contextual user interface includes at least a first item and a second item;
        receive, in response to a first interaction with the first contextual user interface, data indicating selection of the first item;
        determine that the first item is associated with the first provider;
        obtain a set of previously selected items, wherein individual items of the set of previously selected items were previously selected during a network session in which items are made available for selection, and wherein each of the set of previously selected items is associated with a provider;
        determine that no items in the set of previously selected items are associated with the first provider;
        cause display of a notification that the selection of the first item represents a first interaction with the first provider in the network session;
        identify one or more other items that are associated with the first provider; and
        cause display of a second contextual user interface associated with a second context, wherein the second context includes the first provider and excludes the second provider, and wherein the second contextual user interface includes the one or more other items.

2. The system of claim 1, wherein the processor is further configured to at least cause display of the second contextual user interface in response to a second interaction with the notification, the second interaction indicating selection of the second context.

3. The system of claim 2, wherein the network session begins at a time at which the first contextual user interface was first displayed, or a time at which the second contextual user interface was last displayed.

4. The system of claim 1, wherein the notification indicates that the first item partially satisfies a criterion of the first provider.

5. The system of claim 1, wherein the processor is further configured to at least update the set of previously selected items in response to the selection of the first item.

6. A computer-implemented method comprising:
    under control of a computing device configured with specific computer-executable instructions,
    determining, from a set of previously selected items, a set of providers of the previously selected items, wherein, for each provider in the set of providers, at least one item associated with the provider was previously selected during a current network session;
    causing display of a first contextual user interface associated with a first context, wherein the first context is associated with at least a first provider and a second provider, wherein the first contextual user interface includes at least a first item and a second item;
    receiving, in response to an interaction with the first contextual user interface, data indicating selection of the first item;
    determining that the first item is associated with the first provider;
    determining that the set of providers of the previously selected items excludes the first provider;
    generating a notification regarding the first provider, the notification indicating that the selection of the first item is a first selection of an item associated with the first provider during the current network session; and
    causing display of the notification regarding the first provider.

7. The computer-implemented method of claim 6 further comprising determining a start time of the current network session.

8. The computer-implemented method of claim 7, wherein the current network session is determined based at least in part on an elapsed time since a previous selection of an item.

9. The computer-implemented method of claim 7, wherein the start time of the current network session is determined based at least in part on an elapsed time since display of a user interface including the first provider and excluding the second provider.

10. The computer-implemented method of claim 7, wherein the notification further indicates that the selection of the first item partially satisfies a criterion associated with the first provider.

11. The computer-implemented method of claim 6, wherein the notification is at least one of:
    displayed within the first user interface;
    displayed in front of the first user interface; or
    displayed as at least part of the first user interface is scrolled out of view.

12. The computer-implemented method of claim 6 further comprising:
    receiving data indicating selection of the notification; and causing display of a second contextual user interface that corresponds to the first provider, the second contextual user interface including at least one or more items associated with the first provider and excluding items associated with other providers.

13. The computer-implemented method of claim 12 further comprising determining, from a plurality of items, the one or more items associated with the first provider.

14. The computer-implemented method of claim 12 further comprising:
   receiving, in response to an interaction with the second contextual user interface, data indicating navigation away from the second contextual user interface;
   determining that a criterion associated with the first provider has been satisfied; and
   displaying a second notification indicating that the criterion associated with the first provider has been satisfied.

15. A system comprising:
   a data store configured to store computer-executable instructions; and
   a processor in communication with the data store, wherein the computer-executable instructions, when executed by the processor, configure the processor to:
      determine a set of items that have been selected during a current session;
      determine, from the set of items, a set of providers of the set of items, wherein each provider in the set of providers is associated with at least one item in the set of items;
      cause display of a first contextual user interface associated with a first context, wherein the first context is associated with at least a first provider, the first user interface including at least a first item;
      receive, in response to an interaction with the first contextual user interface, data indicating selection of the first item;
      determine that the first item is associated with the first provider;
      determine that the set of providers does not include the first provider; and
      display a notification indicating that the selection of the first item is a first selection of an item associated with the first provider during the current session.

16. The system of claim 15, wherein the processor is further configured to determine, based at least in part on a user preference, to display the notification.

17. The system of claim 16, wherein the processor is further configured to determine the user preference based at least in part on a user history.

18. The system of claim 15, wherein the notification comprises at least one of a review of the first provider, a promotional item associated with the first provider, a delivery window of the first provider, an order criterion of the first provider, an order history with the first provider, or a link to a user interface associated with the first provider.

19. The system of claim 15, wherein the first item is further associated with a second provider, and wherein the processor is further configured to:
   display a user interface element that enables selection of at least the first provider or the second provider;
   receive, in response to an interaction with the user interface element, data indicating selection of the first provider to provide the first item; and
   determine to display the notification based at least in part on the data indicating selection of the first provider.

20. The system of claim 15, wherein the first item is further associated with a second provider, and wherein the processor is further configured to determine that the first provider will provide the first item based at least in part on a user preference.

* * * * *